2,811,508

CONDENSATION OF PHENOL AND ALDEHYDE WITH TRICHLOROACETIC ACID AND PRODUCTION OF PHENOLALDEHYDE RESIN FREE OF ACID CATALYST

Werner E. Kleinicke, Manhasset, N. Y., assignor to Allied Chemical & Dye Corporation, New York, N. Y., a corporation of New York No Drawing. Application September 22, 1955, Serial No. 536,048

8 Claims. (Cl. 260—51)

This invention relates to the manufacture of phenolic resins and more particularly refers to a new and improved method of producing acid-catalyzed phenolformaldehyde resins.

The conventional method for producing acid-catalyzed phenolic resins is to heat a mixture of phenol and formaldehyde in the presence of a small amount of catalyst such as sulfuric acid, hydrochloric acid, and oxalic acid in a kettle to effect condensation of the phenol and formaldehyde and then dehydrate the reaction mass by distilling off the water under vacuum. Sulfuric acid is most commonly used as a catalyst in making phenolic resins. A disadvantage of this catalyst is that it remains in the final resin and has a tendency to darken the resinous product during bodying. Use of hydrochloric acid will result in production of lighter colored phenolic resins; however, in bodying these resins to high temperature, the acid is collected in the distillate and constitutes a considerable corrosion problem. Oxalic acid, a much weaker acid than either sulfuric acid or hydrochloric acid, has been employed to some extent in the condensation of phenol and formaldehyde but, of course, is not as strong a catalyst as either the sulfuric acid or hydrochloric acid. More important the catalytic action of oxalic acid is too weak to properly induce the reaction between substituted phenols, e. g. cumyl phenol, paraphenyl phenol, and formaldehyde unless drastic conditions are used such as a bodying temperature in excess of 200° C. or the reaction is carried out at superatmospheric pressure. It is not possible when employing oxalic acid to produce hard resins of melting points of 75° C. or higher without recourse to abovementioned reaction conditions, such hardness being required to produce resins suitable for the preparation of fast-drying alkali- and water-resistant drying oil varnishes.

One object of the present invention is to provide a process for the condensation of a phenol and formaldehyde in the presence of an acid catalyst to produce phenolformaldehyde resin free of the acid catalyst or salts thereof.

Another object of this invention is to provide an efficient process for the preparation of clear, light-colored resins having a melting point of approximately 75°–80° C. or higher by reaction of a substituted phenol with formaldehyde in the presence of trichloroacetic acid.

A further object of the present invention is to provide a method of reacting a phenol and an aldehyde in the presence of trichloroacetic acid as a catalyst and effecting removal of the catalyst from the reaction mass without neutralization.

Other objects and advantages of the invention will be apparent from the following description.

In accordance with the present invention, a mixture of a phenol and an aldehyde are heated in the presence of a small amount, desirably less than 5% and preferably between 1–4%, trichloroacetic acid as a catalyst to a temperature below about 90° C., preferably, in the range of 60–85° C., until the reaction is completed, i. e. until the amount of free aldehyde is reduced to less than 4%, preferably about 2% or less, heating the reaction mass in the presence of a substantial amount of water, at least 15% and preferably more than 25% water by weight of the reaction mass to a temperature above 100° C., preferably within the range of about 100–120° C. to effect decomposition of the trichloroacetic acid into chloroform and carbon dioxide, maintaining a 15%, preferably a 25%, by weight concentration of water in the reaction mass and continuing the heating until all chloroform and carbon dioxide are distilled over, and then dehydrating the reaction mass freed of trichloroacetic acid, preferably under vacuum, to effect removal of water.

I have found that trichloroacetic acid, an extremely strong acid, will rapidly and effectively catalyze the reaction of phenol and formaldehyde. Substituted phenols, particularly para-alpha-cumyl phenol and paraphenyl phenol, are sluggish in their reaction with formaldehyde and require a strong acid to effect their condensation. The use of weak acids for effecting condensation of these substituted phenols requires either an unduly long time or too high temperatures and in either event results in an unsatisfactory product. Trichloroacetic acid will properly catalyze the reaction between the substituted phenols and formaldehyde to produce clear and light-colored resins having a melting point of approximately 80° C. or higher which are fully compatible with drying oils such as linseed oil. However in the production of these hard resins it is not only necessary to employ a strong catalyst but also to free the reaction mass from the acid catalyst or salts thereof.

Trichloroacetic acid when utilized as a catalyst in the reaction of a phenol and an aldehyde is relatively stable and will not decompose at a temperature below 100° C. Accordingly, I effect the condensation reaction at a temperature below about 90° C. Trichloroacetic acid at a temperature above 100° C. and in the presence of a substantial amount of water will break down into harmless decomposition products, namely, chloroform and carbon dioxide. Accordingly, after the condensation reaction has been completed at a temperature below about 90° C., the reaction mass is heated without prior removal of water to a temperature above 100° C. until the trichloroacetic acid catalyst is decomposed and all the chloroform and carbon dioxide evolved from the reaction mass. To insure an adequate amount of water in the reaction mass, at least 15% water by weight of the reaction mass, to effect decomposition of the trichloroacetic acid during the decomposition period, water from an external source may be introduced into the reaction mass to maintain the desired water concentration, or alternatively, if the reaction mass initially contains sufficient water, the water concentration may be maintained by effecting the decomposition reaction under sufficient superatmospheric pressure to restrain the distillation of water from the reaction mass. The resulting reaction mass may then be freed of water by distillation under vacuum. It is of importance to note that the catalyst will only break down if, after completion of the reaction, the temperature of the reaction mass containing water is raised above 100° C. If, on the other hand, the reaction mass is dehydrated first at a temperature below 100° C. and thereafter raised to a temperature above 100° C., the catalyst remains intact and may cause gelation of any varnish that may be made from the resin and the drying oil. However, if the reaction mass resulting from the condensation of a phenol and an aldehyde in the presence of trichloroacetic acid at a temperature below 90° C. is heated in the presence of at least 15% by weight water to a temperature in excess of 100° C. until chloroform and carbon dioxide resulting from the decomposition of trichloroacetic acid are removed and the resultant reaction mass subsequently dehydrated, the resin thus produced is free from chloride ions and the distillate does not contain chloride ions in the form of hydrochloric acid thereby eliminating any corrosion problem encountered with the use of hydrochloric acid.

The condensation reaction may be carried out in conventional resin-forming equipment consisting primarily of a kettle, dome, vapor pipe, condenser, receiver, and vacuum pump. The phenolic reactant may be straight phenol or substituted phenols wherein one or more hydrogens attached to the benzene ring of phenol is substituted by an alkyl, aryl, aralkyl and alkaryl radical. The process of the present invention is particularly adapted to the condensation of phenols having an alkaryl substituent such as cumyl phenol or aryl substituent such as phenyl phenol. The other reactant, aldehyde, may be in the form of an aqueous solution, as for example, formalin which is about 37% solution of formaldehyde and water, and anhydrous aldehyde, as for example, paraformaldehyde and an alcohol solution of formaldehyde. Examples of aldehydes other than formaldehyde which may be employed in my process are furfuraldehyde, acetaldehyde and crotonaldehyde.

The ratio of phenol and aldehyde employed will depend upon characteristics of the resin desired and generally will vary from a phenol-aldehyde mol ratio of 1:1.4 to 1:0.8. Higher melting point resins are favored by employing a slight molal excess of aldehyde.

Only small amounts of trichloroacetic acid are required to catalyze the phenol-aldehyde reaction. Less than 5% and generally between 2–3% catalyst by weight of the reactants will be found adequate to effect the condensation.

The mixture of phenol-aldehyde and trichloroacetic acid catalyst is heated in a kettle equipped with the usual agitator and reflux condenser to a temperature within the range of about 60°–85° C. under substantially atmospheric pressure for a sufficient length of time to complete the reaction. The reaction is completed when all, or substantially all, of the aldehyde is reacted, i. e. the reaction mass contains not more than a few percent free aldehyde. The percent of aldehyde may be determined by withdrawing a sample and analyzing it by the conventional hydroxylamine method. Although the reaction time will vary depending upon the reactants, the relative proportion of reactants and the temperature, ordinarily 150 to 360 minutes will be sufficient to effect the condensation of the aldehyde and phenol.

The next step of the process is decomposition of the trichloroacetic acid. Since, as previously stated, decomposition of trichloroacetic acid into $CO_2$ and $CCl_3H$ requires the presence of water and a temperature in excess of 100° C., dehydration of the reaction mass at temperatures below 100° C. should be avoided prior to decomposing trichloroacetic acid. Even though anhydrous reactants are employed in the condensation reaction, water is present to some extent in the reaction mass due to the splitting off of water during the reaction of a phenol and an aldehyde. Of course, if an aqueous solution of a reactant is employed as the starting material as is quite common, the reaction mass will contain a greater amount of water. If the reaction mass contains an inadequate amount of water to effect decomposition of the trichloroacetic acid, additional water may be added. When an aqueous solution of a reactant is used the water in the reaction mass will usually be sufficient to effect decomposition of the trichloroacetic acid. Accordingly, after completion of the reaction, the reaction mass is brought to the boiling point, above 100° C., and maintained at the boiling point by gradually increasing the temperature until all the trichloroacetic acid has been converted into chloroform and carbon dioxide and the chloroform and carbon dioxide removed as vapors from the reaction mass. During the evolution of chloroform and carbon dioxide, some water is distilled off with the chloroform-carbon dioxide vapors. Sufficient water, as required, is added to the reaction mass during the decomposition period to maintain the concentration of water in the mass at least 15% by weight water. The water concentration in the mass may also be maintained by conducting the decomposition reaction under superatmospheric pressure of the order of 30–60 p. s. i. g. or higher. About 2 to 3 hours heating at temperatures above 100° C. has been found sufficient to effect decomposition of the trichloroacetic acid and removal of the decomposition products.

After removal of the trichloroacetic acid from the reaction mass, substantially complete dehydration is effected in any conventional manner as for example, by heating the mass under vacuum until all the water has been removed. The dehydrated resin is light-colored, free of chlorine, of high melting point and compatible with drying oils.

The following examples illustrate the present invention.

*Example 1*

Paracumyl phenol and 37% aqueous formaldehyde solution in the proportion of 1 mol p-cumyl phenol to 1.2 mols of formaldehyde together with 3% by weight of trichloroacetic acid based on the phenol-formaldehyde charged, are introduced into a kettle and heated to a temperature of 70° C. under substantially atmospheric pressure and maintained at that temperature under constant agitation and with refluxing until the free formaldehyde content of the reaction mass in reduced to 2.5%. The reaction mass is then heated under a superatmospheric pressure of 50 p. s. i. g. for a period of 3 hours from a temperature of about 100° C. to about 120° C. during which time the trichloroacetic acid is decomposed into chloroform and carbon dioxide and the decomposition products are removed as vapors. A vacuum of 26–28 inches Hg abs. is gradually applied to the kettle and the temperature of the reaction mass gradually raised to within the range of 125°–150° C. until the resin is substantially completely dehydrated. The resultant final resin is light-colored, has a melting point of 80° C. and is completely compatible with linseed oil.

*Example 2*

1 mol p-cumyl phenol and 1 mol of formaldehyde are reacted with 2% by weight of trichloroacetic acid using the procedure and conditions of Example 1. The resultant final resin is light-colored, has a melting point of 76° C. and is completely compatible with linseed oil.

Although certain preferred embodiments of the invention have been disclosed for purpose of illustration it will be evident that various changes and modifications may be made therein without departing from the scope and spirit of the invention.

I claim:

1. A process for the manufacture of phenol-aldehyde resins which comprises heating a mixture of a phenol selected from the group consisting of phenol, alkyl phenol, aryl phenol, aralkyl phenol and alkaryl phenol and an aldehyde in the presence of small amount of trichloroacetic acid as a catalyst to a temperature below about 90° C. for a sufficient length of time to effect condensation of the phenol and aldehyde and reduce the amount of free aldehyde to less than 4%, maintaining a water concentration of at least 15% by weight in the reaction mass and heating the reaction mass to a temperature above 100° C. for a sufficient length of time to effect decomposition of the trichloroacetic acid into chloroform and carbon dioxide, and dehydrating the reaction mass.

2. A process for the manufacture of phenol-formaldehyde resins which comprises heating a mixture of a phenol selected from the group consisting of phenol, alkyl phenol, aryl phenol, aralkyl phenol and alkaryl phenol and formaldehyde in the presence of a small amount of trichloroacetic acid as a catalyst to a temperature in the range of about 60-85° C. for a sufficient length of time to effect condensation of the phenol and formaldehyde and reduce the amount of free formaldehyde to less than 4% maintaining a water concentration of at least 15% by weight in the reaction mass and heating the reaction mass to a temperature from above 100° C. to about 120° C. for a sufficient length of time to effect decomposition of the trichloroacetic acid into chloroform and carbon dioxide and continuing the heating until the chloroform and carbon dioxide are distilled off, and dehydrating the reaction mass freed of trichloroacetic acid to effect removal of water.

3. A process for manufacture of phenol-formaldehyde resins which comprises heating a mixture of a phenol selected from the group consisting of phenol, alkyl phenol, aryl phenol, aralkyl phenol and alkaryl phenol and aqueous formaldehyde in the presence of 1-4% trichloroacetic acid as a catalyst to a temperature in the range of about 60-85° C. until the amount of free formaldehyde is reduced to less than 4%, heating the reaction mass without prior removal of water under sufficient pressure to restrain distillation of water so as to maintain a water concentration of at least 15% by weight in the reaction mass to a temperature above 100° C. for a sufficient length of time to effect decomposition of the trichloroacetic acid to chloroform and carbon dioxide and continuing the heating until the chloroform and carbon dioxide are distilled off, and dehydrating the reaction mass freed of trichloroacetic acid under vacuum to effect removal of water.

4. A process for the manufacture of phenolaldehyde resins which comprises heating a mixture of a phenol selected from the group consisting of phenol, alkyl phenol, aryl phenol, aralkyl phenol and alkaryl phenol and aldehyde in the presence of a small amount of trichloroacetic acid as a catalyst to a temperature below about 90° C. for a sufficient length of time to effect condensation of the phenol and aldehyde and reduce the amount of free aldehyde to less than 4%, heating the reaction mass in the presence of at least 15% by weight water to a temperature above 100° C. for a sufficient length of time to effect decomposition of the trichloroacetic acid into chloroform and carbon dioxide, introducing water into the reaction mass during the decomposition period to maintain the concentration of water in the reaction mass above 15% by weight of the mass, and dehydrating the reaction mass.

5. A process for the manufacture of phenolaldehyde resins which comprises heating a mixture of an aryl phenol and an aldehyde in the presence of a small amount of trichloroacetic acid as a catalyst to a temperature below about 90° C. for a sufficient length of time to effect condensation of the aryl phenol and aldehyde and reduce the amount of free aldehyde to less than 4%, maintaining a water concentration of at least 15% by weight in the reaction mass and heating the reaction mass to a temperature above 100° C. for a sufficient length of time to effect decomposition of the trichloroacetic acid into chloroform and carbon dioxide, and dehydrating the reaction mass.

6. A process for the manufacture of phenolformaldehyde resins which comprises heating a mixture of an aryl phenol and formaldehyde in the presence of a small amount of trichloroacetic acid as a catalyst to a temperature in the range of about 60-85° C. for a sufficient length of time to effect condensation of the aryl phenol and formaldehyde and reduce the amount of free formaldehyde to less than 4%, maintaining a water concentration of at least 15% by weight in the reaction mass and heating the reaction mass in the presence of water to a temperature from above 100° C. to about 120° C. for a sufficient length of time to effect decomposition of the trichloroacetic acid into chloroform and carbon dioxide and continuing the heating until the chloroform and carbon dioxide are distilled off, and dehydrating the reaction mass freed of trichloroacetic acid to effect removal of water.

7. A process for the manufacture of phenolformaldehyde resins which comprises heating a mixture of cumyl phenol and formaldehyde in the presence of a small amount of trichloroacetic acid as a catalyst to a temperature in the range of about 60-85° C. for a sufficient length of time to effect condensation of the cumyl phenol and formaldehyde and reduce the amount of free formaldehyde to less than 4%, maintaining a water concentration of at least 15% by weight in the reaction mass and heating the reaction mass in the presence of water to a temperature above 100° C. for a sufficient length of time to effect decomposition of the trichloroacetic acid into chloroform and carbon dioxide and continuing the heating until the cholorform and carbon dioxide are distilled off, and dehydrating the reaction mass freed of trichloroacetic acid to effect removal of water.

8. A process for the manufacture of phenolformaldehyde resins which comprises heating a mixture of paraphenyl phenol and formaldehyde in the presence of a small amount of trichloroacetic acid as a catalyst to a temperature in the range of about 60-85° C. for a sufficient length of time to effect condensation of the paraphenyl phenol and formaldehyde and reduce the amount of free formaldehyde to less than 4%, maintaining a water concentration of at least 15% by weight in the reaction mass and heating the reaction mass in the presence of water to a temperature above 100° C. for a sufficient length of time to effect decomposition of the trichloroacetic acid into chloroform and carbon dioxide and continuing the heating until the chloroform and carbon dioxide are distilled off, and dehydrating the reaction mass freed of trichloroacetic acid to effect removal of water.

References Cited in the file of this patent

UNITED STATES PATENTS

| 1,846,853 | Ellis | Feb. 23, 1932 |

FOREIGN PATENTS

| 481,069 | Great Britain | Mar. 4, 1938 |